(12) United States Patent  (10) Patent No.: US 6,470,961 B1
Case  (45) Date of Patent: Oct. 29, 2002

(54) CONDENSER, RADIATOR AND FAN ASSEMBLY MODULE

(75) Inventor: Christopher J. Case, Warren, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/041,203

(22) Filed: Jan. 8, 2002

(51) Int. Cl.[7] .............................. F28F 9/00; B60K 11/04
(52) U.S. Cl. .................... 165/78; 165/140; 165/149; 180/68.4
(58) Field of Search ........................ 165/67, 76, 78, 165/149, 140; 180/68.4

(56) References Cited

U.S. PATENT DOCUMENTS

| 2,615,687 | A | * | 10/1952 | Simmons | 165/149 |
| 3,731,736 | A | * | 5/1973 | Fernandes | 165/143 |
| 4,403,648 | A | * | 9/1983 | Styok | 165/149 |
| 4,474,232 | A | * | 10/1984 | Wright et al. | 165/137 |
| 5,046,554 | A | * | 9/1991 | Iwasaki et al. | 123/41.49 |
| 5,113,930 | A | * | 5/1992 | le Gauyer | 165/140 |
| 5,597,047 | A | * | 1/1997 | Thompson et al. | 180/68.4 |
| 6,073,594 | A | * | 6/2000 | Tsukiana et al. | 123/41.33 |
| 6,386,273 | B1 | * | 5/2002 | Hateley | 165/149 |

OTHER PUBLICATIONS

Photograph of radiator and transmission fluid fitting of a 1995 Jeep, DaimlerChrysler, Auburn Hills, MI.

* cited by examiner

Primary Examiner—Allen Flanigan
(74) Attorney, Agent, or Firm—Laura C. Hargitt

(57) ABSTRACT

A condenser, radiator and fan assembly module for providing modular installation and simplified individual servicing of the components thereof. The module includes a condenser, a radiator, a fan assembly, and a module frame having a set of channels for respectively receiving therein each of the condenser, radiator and fan assembly. Each of the condenser, the radiator and the fan assembly are slidably received into its respective channel. A floor of the module frame may be disassembled to facilitate individual sliding removal of any of the condenser, radiator or fan assembly. To facilitate sliding installation and removal of the radiator, the coolant inlet fitting and the coolant outlet fitting are each threadably engaged into a respective threaded opening in the tank of the radiator.

15 Claims, 3 Drawing Sheets

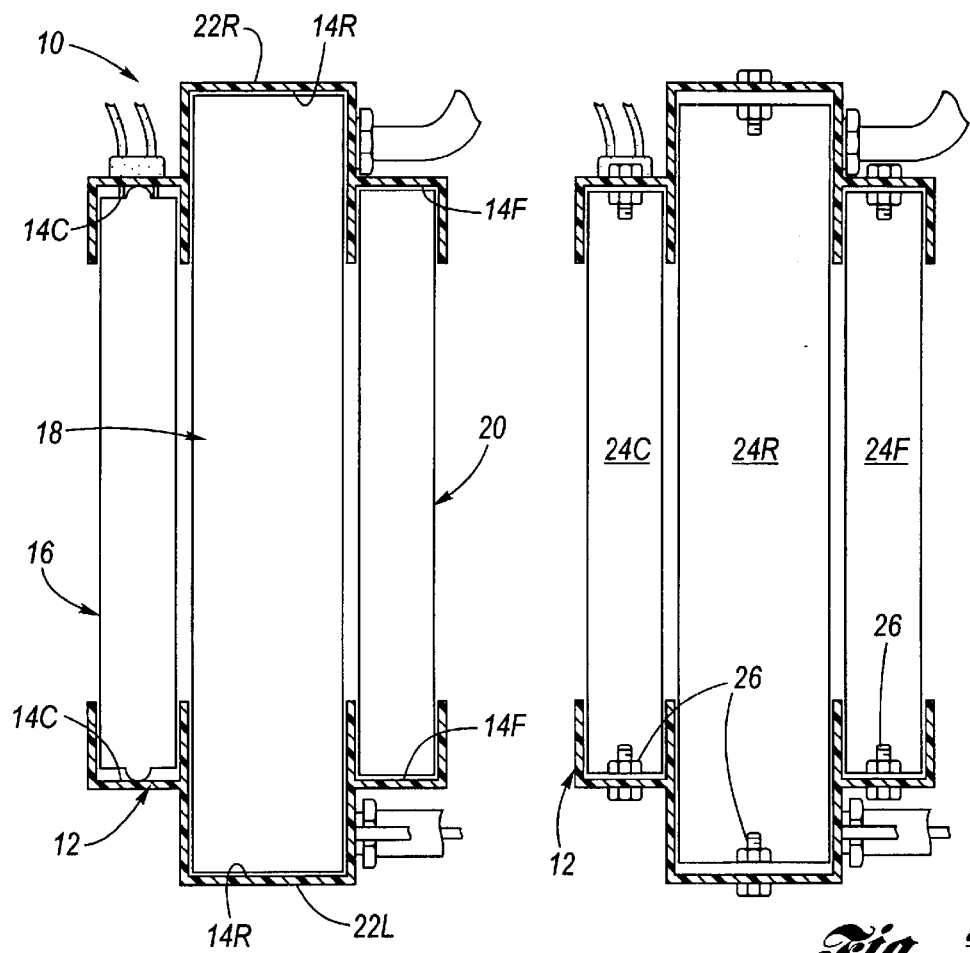
Fig. 2
Fig. 3
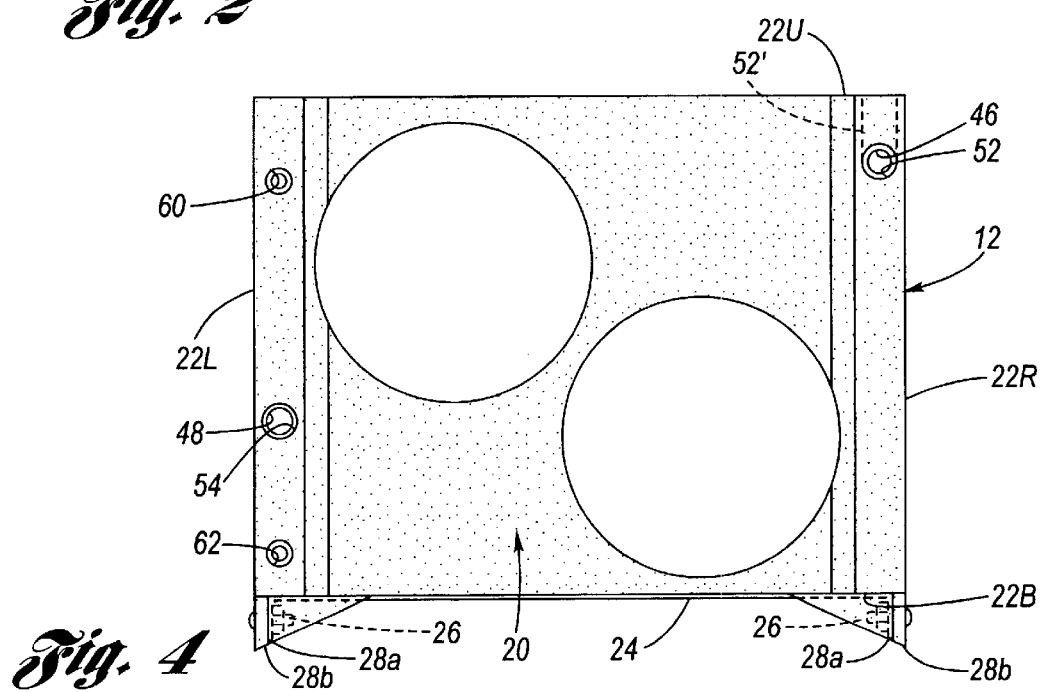
Fig. 4

CONDENSER, RADIATOR AND FAN ASSEMBLY MODULE

TECHNICAL FIELD

The present invention relates to automotive engine cooling and air conditioning systems, and more particularly to a module which facilitates easy installation and servicing of the condenser, radiator and fan assembly components thereof.

BACKGROUND OF THE INVENTION

Internal combustion engines used for automotive applications utilize a cooling system for assuring proper cooling of the engine during its operation. The cooling system includes a radiator and a fan assembly which provides an atmospheric heat dump for a circulating liquid coolant. Additionally, many motor vehicles now include, either as an option or as standard equipment, passenger compartment air conditioning. Air conditioning also must have an atmospheric heat dump to operate properly, in this case via a condenser through which heated refrigerant circulates.

Conventionally, the condenser and radiator are rectangularly shaped of more or less comparable dimensions and placed in a closely-spaced, stacked relationship at a vehicle location whereat air flow therethrough is facilitated. In this regard, a fan assembly is placed adjacent the condenser/radiator pair so as to assure air flow therethrough even in situations where the motor vehicle is stationary.

Further, it is conventional practice to independently mount the condenser, radiator and fan assembly to the framework of the motor vehicle. Additionally, it is normal practice to provide integrally interconnected coolant inlet/outlet fittings to the radiator for removably connecting thereto a respective coolant hose.

While the conventional condenser, radiator and fan assembly practice provides adequate refrigerant and coolant cooling, there are a number of drawbacks with the conventional practice. For example, the discrete nature of the components necessitates individual shipment, storage and installation of each of the components into a motor vehicle. Further for example, should servicing of any one of the components become necessary, the interrelated mounting connections generally necessitates removal of at least one other component in order to access the problem component. Further yet for example, short overhang configured vehicles present installation and servicing difficulties with respect to the conventional practice due to the imposed compactness of such designs.

Accordingly, what remains needed in the art is a configuration for the condenser, radiator and fan assembly components which does not have the aforementioned drawbacks.

SUMMARY OF THE INVENTION

The present invention is a condenser, radiator and fan assembly module, hereinafter referred to simply as a "CRF module," for providing modular installation and simplified individual servicing of the components thereof.

The CRF module according to the present invention includes a condenser, a radiator, a fan assembly, and a module frame having a set of channels for respectively receiving therein each of the condenser, radiator and fan assembly. In a preferred configuration, the module frame has a fan assembly channel at a forward end, a condenser channel at a rear end, and a radiator channel situated therebetween.

In operation of the CRF module, each of the condenser, the radiator and the fan assembly are slidably received into its respective channel. A floor of the module frame may be disassembled to facilitate individual sliding removal of any of the condenser, radiator or fan assembly. To facilitate sliding installation and removal of the radiator, the coolant inlet fitting and the coolant outlet fitting are each threadably engaged into a respective threaded opening in the tank of the radiator. In this regard, an annular flange of the coolant inlet fitting and the coolant outlet fitting compresses a gasket relative to the tank, thereby ensuring a leak-proof seal. The module frame has openings formed therein to accommodate, respectively, the coolant inlet/outlet fittings and the transmission fluid inlet/outlet fittings of the radiator, as well as the refrigerant inlet/outlet fittings of the condenser.

The module frame provides a modular integration of the condenser, radiator and fan assembly, which simplifies motor vehicle assembly operations. One unique reason for this simplification is that the CRF module is preferably preassembled and then shipped to the manufacturing plant as a unit, simplifies individual servicing of each of the aforesaid components over the life of the vehicle, and provides a unified, compact package suitable for installation in short overhang configured vehicles.

The CRF module allows modularity build with component build for serviceability, and has, among others, the following benefits and advantages: warranty cost reduction and less service labor; ease of manufacturing wherein the module frame serves as a shipping container, and the CRF module can be installed "as is" into a vehicle at the assembly plant; parts reduction, in that the need for various radiators specific to certain models of vehicle are obviated due to interchangeable water necks and interfaced bracketing to fit a standard module frame; and ease of service, in that all components are serviceable from top or bottom, independent of the others, and the required service envelope is reduced (the size of the service envelope being just the access load path used for manufacturing).

Accordingly, it is an object of the present invention to provide a modular integration of the condenser, radiator and fan assembly of a motor vehicle to thereby simplify assembly and servicing operations.

This and additional objects, features and advantages of the present invention will become clearer from the following specification of a preferred embodiment.

BRIEF DESCRIPTION OF THE DRAWINGS

FIG. 2 is a top plan view of the CRF module according to the present invention, wherein fittings are shown connected thereto.

FIG. 3 is a bottom plan view of the CRF module according to the present invention, wherein fittings are shown connected thereto.

FIG. 4 is a front view of the CRF module according to the present invention.

DESCRIPTION OF THE PREFERRED EMBODIMENT

Figure 1:
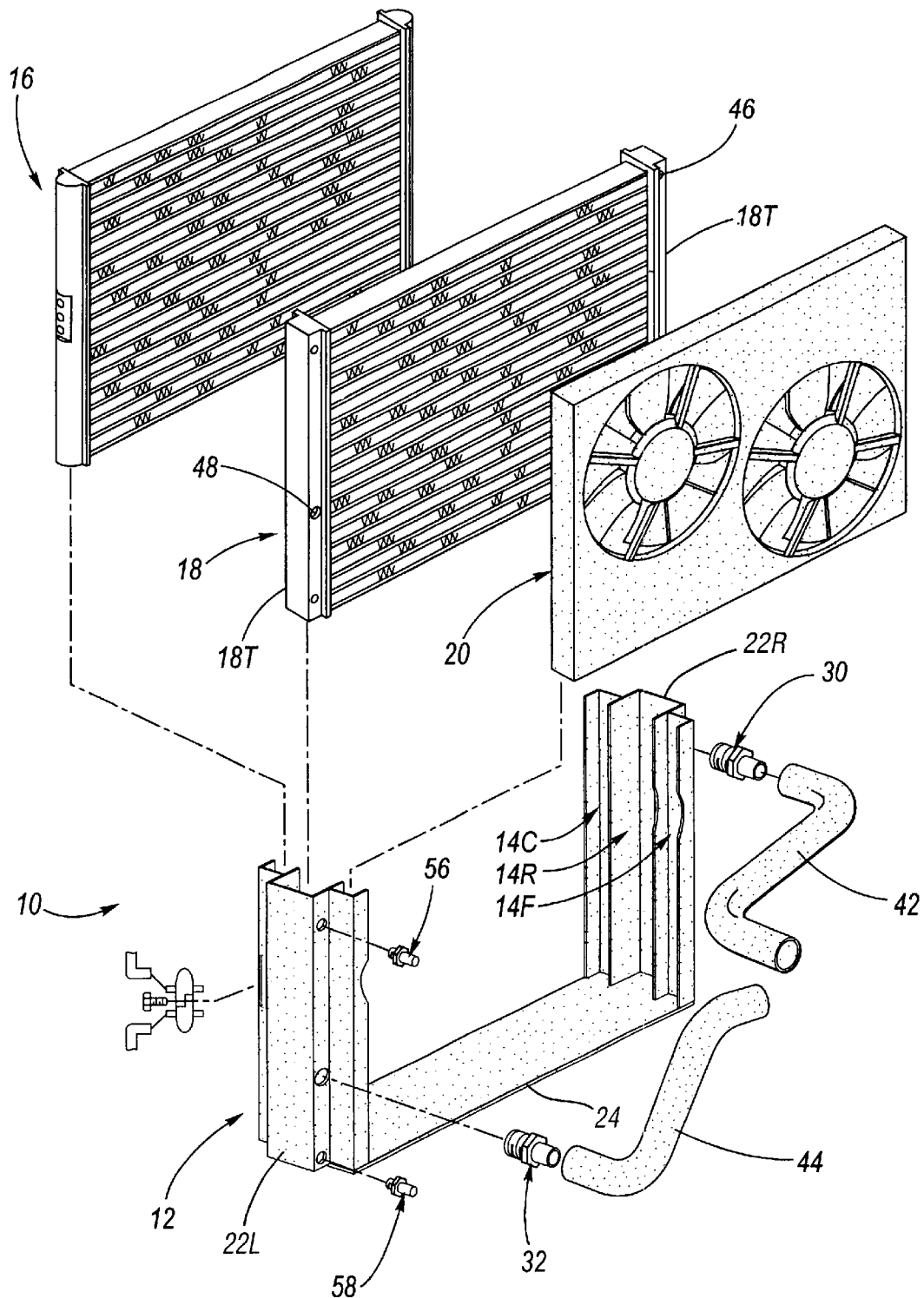
FIG. 1 is an exploded, perspective view of a preferred example of a CRF module according to the present invention.

Referring now to the Drawing, FIG. 1 depicts a preferred embodiment of a condenser, radiator and fan assembly module (a CRF module) 10 according to the present invention. The CRF module 10 includes a module frame 12 having channels 14C, 14R, 14F for removably receiving therein, respectively, each of a condenser 16, a radiator 18, and a fan assembly 20, wherein the radiator is placed between the condenser and the fan assembly. The module frame 10 may have more or less than three channels, depending on the number of components used therewith which, at a minimum, includes the radiator.

The module frame 12 is composed preferably of a plastic material. Although the module frame 12 may be a single piece unit, it is preferred that the module frame 12 be an assembly of left and right sidewalls 22L, 22R and a floor 24. The floor 24 is removably connected to the left and right sidewalls 22L, 22R. The removable connection may be any suitable mechanical attachment, as for example shown at FIGS. 3 and 4, wherein threaded fasteners 26 secure affixment flanges 28a, 28b respectively of the floor 24 and the left and right sidewalls 22L, 22R. The floor 24 may be a single piece (as shown at FIG. 4), or may alternatively be discretely composed of a condenser floor member 24C, a radiator floor member 24R, and a fan assembly floor member 24F, each of which being individually assembled with respect to the left and right sidewalls 22L, 22R (as shown at FIG. 3). A top cover may be optionally provided, and if so, it is preferably removably connected, as for example as the floor 24 is respectively connected to the left and right sidewalls 22L, 22R.

The radiator channel 14R is sized to receive slidably and snuggly a radiator 18 having predetermined dimensions. Similarly, the condenser channel 14C and the fan assembly channel 14F are each respectively sized based upon predetermined dimensions of the condenser 16 and fan assembly 20 for a slidable, snug fit thereinto. In this regard, each of the radiator 18, the condenser 16 and the fan assembly 20 is slid into its respective channel formed in the left and right sidewalls 22L, 22R and then restingly situated in its respective channel formed in the floor 24. Thereafter, a top cover, or some other member, such as for example a permanently or nonpermanently connected frame member, may be installed across the upper end 22U of the left and right sidewalls 22L, 22R. In this regard, the condenser 16, the radiator 18 and the fan assembly 20 is slidably removed from its seated position by either being slid out of its respective sidewall channel at the upper end 22U of the sidewalls, or else at the bottom end 22B of the sidewalls after removal of the floor 24 therefrom. In this regard, a floor composed of discrete floor components 24C, 24R, 24F, as discussed above, allows for removal of the floor component of the malfunctioning condenser, radiator or fan assembly so that it may be slidingly removed from its channel without affecting the others.

Figure 5:
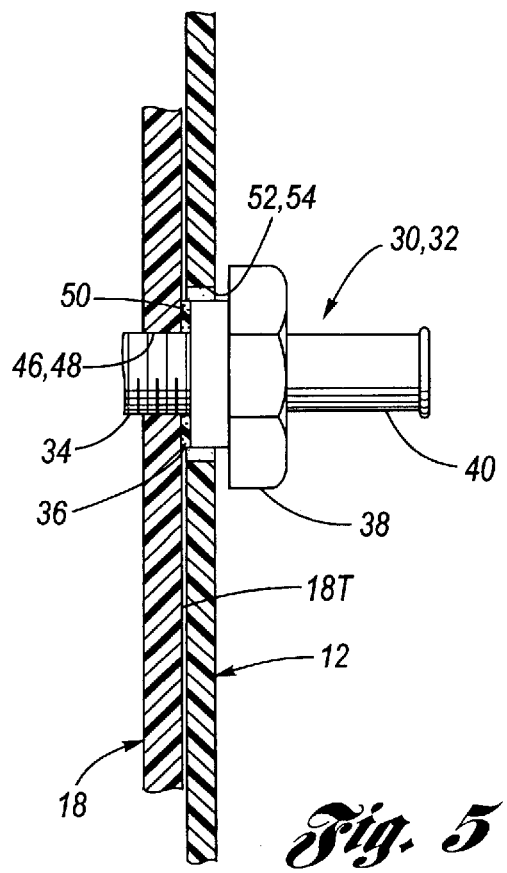
FIG. 5 is a partly sectional, broken-away side view of a coolant fitting installed on a radiator of the CRF module according to the present invention.

In order that the radiator be slidable along the radiator channel 14R in the left and right sidewalls 22L, 22R, the coolant inlet fitting 30 and the coolant outlet fitting 32 are each removably connected to the tank 18T of the radiator 18. As best shown at FIG. 5, each of the coolant inlet fitting 30 and the coolant outlet fitting 32 are provided with a threaded portion 34, an annular flange 36, a tool engaging surface 38 (as for example a hex nut shape), and a hose connector 40 onto which is connected a respective coolant hose 42, 44 in a known manner. The radiator tank 18T has a threaded hole 46, 48 respectively for each of the coolant inlet fitting and the coolant outlet fitting for threading engagement therewith. A gasket 50 is provided which is compressed between the radiator tank 18T and the annular flange 36 such that when each of the coolant inlet fitting and the coolant outlet fitting is tightly threaded into its respective threaded hole 46, 48, the gasket provides a compression seal of the radiator tank against coolant leakage.

An opening 52, 54 is provided in the module frame 12 at the radiator channel 14R of the left and right sidewalls 22L, 22R so that the coolant inlet fitting and the coolant outlet fitting project outwardly therethrough. The openings 52, 54 may be circular holes (as shown) or may be U-shaped slots (see 52' shown in phantom) which extend to, and open at, either the upper end 22U or the bottom end 22B of the left and right sidewalls. In the case a U-shaped slot is provided at the upper end 22U or at the bottom end 22B at which the radiator 18 is slidable from the radiator channel of the left and right sidewalls 22L, 22R, then the particular coolant inlet fitting or coolant outlet fitting thereat may be integral with the tank (the other coolant fitting being removable with respect to the tank).

Figure 6:
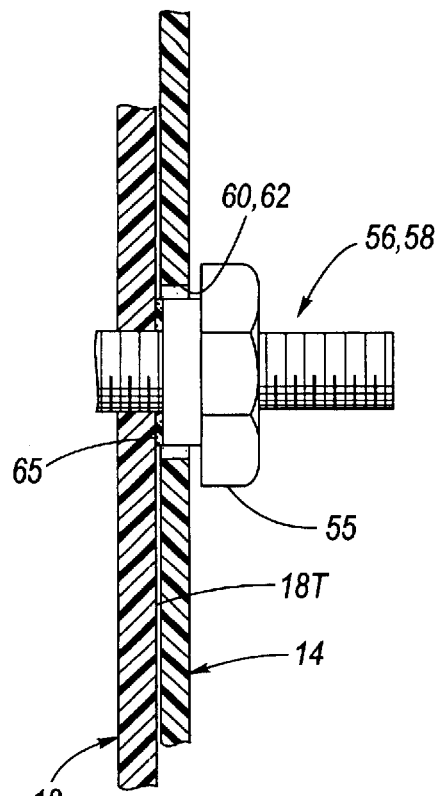
FIG. 6 is a partly sectional, broken-away side view of a transmission fluid fitting installed on a radiator of the CRF module according to the present invention.

As shown at FIG. 6, the transmission fluid inlet 56 and transmission fluid outlet 58 are each threadably removable from the radiator tank 18T in a known manner, which may include a gasket 65. To facilitate the known threaded connection, the left and right sidewalls 22L, 22R are provided with an opening 60, 62 for each.

Figure 7:
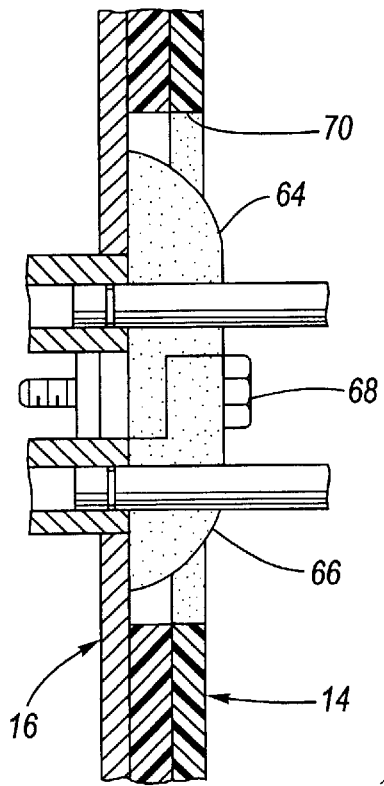
FIG. 7 is a partly sectional, broken-away side view of condenser fittings installed on a condenser of the CRF module according to the present invention.

Referring now to FIG. 7, the condenser refrigerant inlet 64 and the condenser refrigerant outlet 66 are preferably conjoined and secured thereto by a single threaded fastener 68. An opening 70 is provided in the module frame 12 at the condenser channel 14C at either the left or right sidewall 22L, 22R for accommodation of the conjoined condenser fitting.

In operation, the condenser 16 is slid into the condenser channel 14C of the left and right sidewalls 22L, 22R and seated into the condenser channel of the floor 24; the radiator 18 is slid into the radiator channel 14R of the left and right sidewalls and seated into the radiator channel of the floor; and the fan assembly 20 is slid into the fan assembly channel 14F of the left and right sidewalls and seated into the fan assembly channel of the floor. The module frame 12 now serves as a shipping device for the CRF module 10. The CRF module is then installed into a respective motor vehicle. The installation includes affixing the module frame to framework of the vehicle, using for example threaded fasteners and affixment flanges of the module frame. The installation further includes, if not already done so, threading attachment of appropriately sized coolant inlet and outlet fittings to the threaded holes of the radiator tank. The installation still further includes attaching the coolant hoses, transmission fluid hoses and condenser fittings. Should later any of the condenser, radiator or fan assembly need service, the subject component may be removed slidably from its respective channel, which operation may or may not involve removal of the floor (or its respective discrete floor member) from the left and right sidewalls.

It will be recognized by those possessing ordinary skill in the relevant automotive art, that various sized condensers, radiators and fan assemblies can be fitted to a standard size module frame by, for example, simply adjusting the size of spacers to which the component is connected. For example, a vehicle requiring a small sized radiator can utilize a standard sized module frame which accommodates larger radiators if the subject radiator has spacer members attached thereto for fitting into the radiator channel so as to augment the overall dimensions of the subject radiator.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A module comprising:
    a module frame with open sides having at least one channel disposed between said open sidesl; and
    a radiator slidingly seated into a radiator channel of said at least one channel;
    wherein said radiator has a pair of coolant fittings, wherein at least one coolant fitting is removably connected thereto, and wherein said module frame has a pair of openings formed therein through which each of the coolant fittings respectively pass.

2. The module of claim 1, wherein said module frame further has a second pair of openings formed therein through each of which a respective transmission fluid fitting passes; and wherein both coolant fittings are removably connected to said radiator by threading engagement therewith.

3. The module of claim 1, further comprising a fan assembly slidingly seated into a fan assembly channel of said at least one channel.

4. The module of claim 1, further comprising an air conditioning condenser slidingly seated in a condenser channel of said at least one channel; wherein said module frame further has a third opening formed therein through which fittings of said condenser pass.

5. The module of claim 1, wherein said module frame comprises:
    a left sidewall;
    a right sidewall; and
    a floor removably connected to said left and right sidewalls.

6. The module of claim 5, further comprising a fan assembly slidingly seated into a fan assembly channel of said of said at least one channel.

7. The module of claim 6, further comprising an air conditioning condenser slidingly seated in a condenser channel of said of said at least one channel; wherein said module frame further has a third opening formed therein through which fittings of said condenser pass.

8. The module of claim 7, wherein said floor comprises a plurality of discrete floor members comprising:
    a condenser floor member removably connected to said left and right sidewalls at said condenser, wherein said condenser is seated in said condenser channel of said condenser floor;
    a radiator floor member removably connected to said left and right sidewalls at said radiator, wherein said radiator is seated in said radiator channel of said radiator floor; and
    a fan assembly floor member removably connected to said left and right sidewalls at said fan assembly, wherein said fan assembly is seated in said fan assembly channel of said fan assembly floor.

9. The module of claim 8, wherein said module frame further has a second pair of openings formed therein through each of which a respective transmission fluid fitting passes; and wherein both coolant fittings are removably connected to said radiator by threading engagement therewith.

10. The module of claim 9, wherein said condenser has conjoined inlet and outlet fittings removably connected thereto.

11. A condenser, radiator and fan assembly module comprising:
    a module frame having a condenser channel, a radiator channel and a fan assembly channel;
    a condenser slidingly seated in said condenser channel;
    a radiator slidingly seated in said radiator channel; and
    a fan assembly slidingly seated in said fan assembly channel;
    wherein said radiator has a pair of coolant fittings, wherein at least one coolant fitting is removably connected thereto, and wherein said module frame has a pair of openings formed therein through which each of the coolant fittings respectively pass; and
    wherein said module frame further has a second opening formed therein through which fittings of said condenser pass.

12. The module of claim 11, wherein said module frame further has a second pair of openings formed therein through each of which a respective transmission fluid fitting passes; and wherein both coolant fittings are removably connected to said radiator by threading engagement therewith.

13. The module of claim 12, wherein said module frame comprises:
    a left sidewall;
    a right sidewall; and
    a floor removably connected to said left and right sidewalls.

14. The module of claim 13, wherein said floor comprises a plurality of discrete floor members comprising:
    a condenser floor member removably connected to said left and right sidewalls at said condenser, wherein said condenser is seated in said condenser channel of said condenser floor;
    a radiator floor member removably connected to said left and right sidewalls at said radiator, wherein said radiator is seated in said radiator channel of said radiator floor; and
    a fan assembly floor member removably connected to said left and right sidewalls at said fan assembly, wherein said fan assembly is seated in said fan assembly channel of said fan assembly floor.

15. The module of claim 14, wherein said condenser has conjoined inlet and outlet fittings removably connected thereto.

* * * * *